Jan. 26, 1960 C. W. ROSENTHAL 2,922,988

MAGNETIC CORE MEMORY CIRCUITS

Filed Dec. 30, 1954 5 Sheets-Sheet 1

INVENTOR
C. W. ROSENTHAL
BY [signature]
ATTORNEY

Jan. 26, 1960 C. W. ROSENTHAL 2,922,988

MAGNETIC CORE MEMORY CIRCUITS

Filed Dec. 30, 1954 5 Sheets-Sheet 2

INVENTOR
C. W. ROSENTHAL
BY
ATTORNEY

INVENTOR
C. W. ROSENTHAL
BY [signature]
ATTORNEY

Jan. 26, 1960 C. W. ROSENTHAL 2,922,988

MAGNETIC CORE MEMORY CIRCUITS

Filed Dec. 30, 1954

5 Sheets-Sheet 4

INVENTOR
C. W. ROSENTHAL
BY Jansen Falk
ATTORNEY

MAGNETIC CORE MEMORY CIRCUITS

Filed Dec. 30, 1954 5 Sheets-Sheet 5

INVENTOR
C. W. ROSENTHAL
BY
ATTORNEY

United States Patent Office 2,922,988

Patented Jan. 26, 1960

2,922,988

MAGNETIC CORE MEMORY CIRCUITS

Charles W. Rosenthal, New York, N.Y., assignor to Bell Telephone Laboratories, Incorporated, New York, N.Y., a corporation of New York Application December 30, 1954, Serial No. 478,805

17 Claims. (Cl. 340—174)

Figure 1:
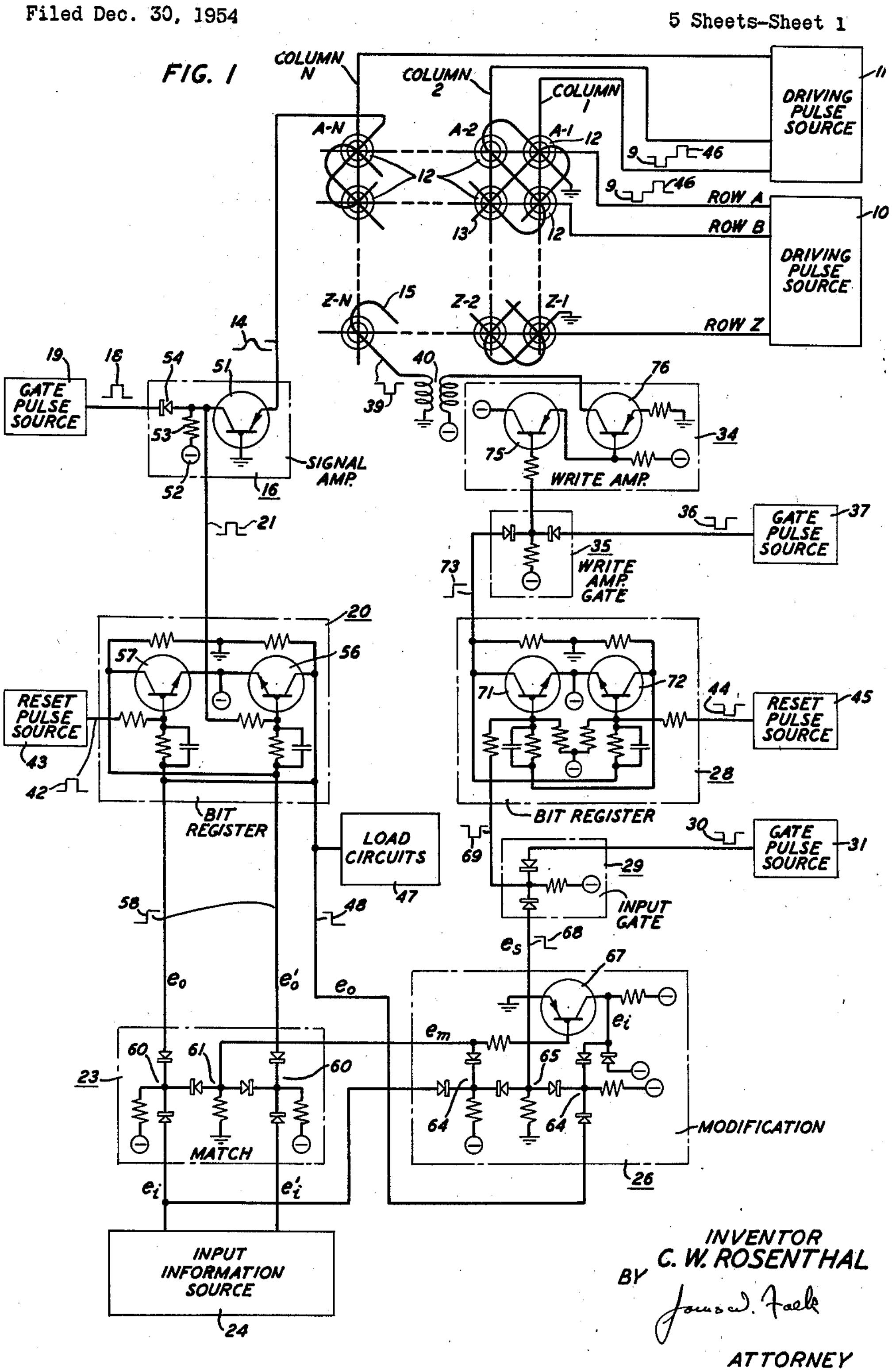

This invention relates to storage circuits and more particularly to memory circuits utilizing magnetic cores.

A problem common to many types of information systems, such as computers or telephone switching control systems, is the storage of a large amount of information pertinent to different units or elements and the availability of this information when required. The information is generally stored with some type of address unique to each information item or message and then, when that particular information item is required, its individual address is employed to locate it. This may be done by cyclically scanning or examining all the information stored until the right address is located.

One example of this type of memory system is a magnetic drum in which information is stored as the magnetic condition of individual spots or cells on the surface of the drum together with the address for that information. When it is desired to employ or alter any of that information, the drum is scanned during one rotation of the drum until the calling address is matched with an address located on the drum. The information stored with the called address on the drum is then read out and utilized or altered, as desired.

It has been known that the same type of memory system can be devised using magnetic cores in a storage matrix in place of the rotating magnetic drum. This has certain obvious advantages in that the overall storage system is considerably lighter and has no moving parts. Further, it has been found that a magnetic core memory matrix is more easily synchronized with other memory systems and devices and is more flexible, allowing easier alteration of permanently stored information after the installation of the memory.

In prior magnetic core matrices, a four-step access cycle has been employed. A magnetic core matrix of this general character is described in "A Myriabit Magnetic Core Memory" by J. A. Rajchman in the Proceedings of the IRE of October 1953. In the subsequent discusion it will facilitate an understanding of the present invention if we consider only a single bit of information that is stored in the memory, although generally the information message that it is desired to utilize will comprise a large number of individual binary bits. It is of course understood that the information is generally stored in the magnetic cores of the matrix by switching the magnetic state of the cores to one or the other value of remanent magnetization, the cores having substantially square hysteresis characteristics, as is known in the art. In these prior matrix circuits the information bit stored in the core has been read out of the core to external circuitry and then regenerated in the core. The other circuitry compares the information bit read from the core with an incoming bit of information. The regenerated bit of information is then read out of the core and the new information, depending on the result of this comparison, written in the core.

It is therefore apparent that the prior matrix systems utilized a four-step process comprising the steps of reading, regenerating, reading, and writing. These four steps may be attained in two full cycles of a driving pulse source, the source applying alternating positive and negative pulses for reading and writing binary information by switching the magnetic state of the core. If there are actually a hundred information bits stored in the matrix, the prior matrix required two hundred cycles, or four hundred steps, in order to complete one scanning and comparison of all the information stored in the matrix.

It is a general object of this invention to provide an improved memory circuit employing a magnetic core matrix.

It is another object of this invention to decrease the time required for complete scanning of all the information stored in a magnetic core memory matrix.

It is a further object of this invention to enable information stored in a magnetic core memory matrix to be read from individual cores in the matrix, modified, if desired, by incoming information, and written back in the matrix, the entire cycle for the matrix requiring substantially half the time required by prior matrix circuits.

These and other objects of this invention are attained in one specific illustrative embodiment wherein a plurality of cores are arranged in a coordinate array in a core matrix. Each core in the array has applied to it a reading magnetomotive force and then a writing magnetomotive force, the two magnetomotive forces advantageously being applied by equal coincident current pulses applied to row and column leads threading each row and column of cores, respectively. When a cycle of reading and writing pulses has been applied to one core, the cycle of pulses is then applied to the next core and so to each core in succession, until the entire matrix has thus had applied to it the reading and writing pulses.

In accordance with an aspect of this invention, the information read from a particular core is not regenerated in that core and then subsequently again read from that core. I have found that the two steps of regeneration and reading out of the regenerated information can be omitted with a concomitant halving of the time required for the reading and examination of all the information stored in the matrix. Instead, in accordance with another aspect of this invention, an overlapping cycle of operation is employed wherein the information stored in one core is read out; information, as modified, from a prior core is placed in that core; information from a subsequent core is read out; and the information, as modified, from that one core is then stored in the subsequent core.

This process is continued until the entire array has been examined and the information modified, if desired, and the process can then be repeated indefinitely. It is to be noted that in a memory matrix in accordance with this invention the information stored in the memory precesses through the memory at a regular rate. Thus it is not possible to assign a particular core to a unique element or occurrence and store information always in that core pertinent to that element or occurrence. Instead, an address is also stored in the magnetic core matrix which precesses through the matrix and is treated in almost the same way as the information message and which is utilized to find the information message pertinent to any particular element or occurrence.

In one specific embodiment of this invention, the information read from a core in the matrix appears on a single read-out wire threading or intersecting all the cores of the matrix; for one binary value of stored information an output pulse will appear on the read-out wire and for the other binary value of stored information no output pulse appears. The output pulse is applied, through an amplifier circuit, to a first bit register circuit where it is temporarily stored. It is then compared, by a match circuit, with incoming information to determine if this is the proper information message and, if so, whether the information should be modified before being stored back into the matrix. Advantageously, additional work circuits, which may utilize the stored information, are also connected to the output of the first bit register circuit.

As a result of this matching operation, a modification circuit will either pass the priorly stored information or the input information to a second bit register circuit, where it is again temporarily stored. The binary value of information or data is then applied, through a timing gate, to a write amplifier circuit. In accordance with another aspect of this invention, a single writing wire is also threaded through each of the cores of the matrix and connected to the output of this writing amplifier. In accordance with this invention, information is advantageously stored in a magnetic core by the concomitant or coincident application of current pulses to the row and column leads intersecting that core, each of the current pulses being of substantially half the magnitude required, with the number of turns employed, to switch the magnetic state of the core. Accordingly at each half cycle of the driving pulse sources two coincident current pulses are applied which are normally sufficient to switch the magnetic state of the core and thus store a particular value of data. If, however, the modification circuit has operated so that the other binary value of data is to be stored, by not switching the magnetic state of the core, then the write amplifier circuit applies an inhibiting or blocking pulse to the single writing wire threading all of the cores.

The blocking pulse is applied coincidently with the writing pulses from the driving pulse sources and is of the opposite polarity. It is advantageously equal in magnitude to one of the coincident writing pulses so that the net magnetomotive force applied to the core is insufficient to switch the magnetic state of that core.

In one specific illustrative embodiment of this invention, timing or enabling pulses are utilized so that the information read out of a magnetic core is applied to a first bit register circuit where it is available for the matching and modification processes while information that had been read out of a prior core is stored, as modified, in a second bit register circuit. When the writing half of the driving cycle occurs, this information in the second bit register is then applied to the writing amplifier to control the writing of the information bit back into the core matrix and specifically in the core from which the information stored in the first bit register has just been read. The second bit register circuit can then be reset following which the information stored in the first bit register circuit, as modified, can be gated to be stored in the second bit register circuit and the first bit register circuit also reset. The first bit register circuit is now ready to receive the information bit from a subsequent core in the matrix, into which core the information, as modified, now stored in the second bit register, will be stored.

It is a feature of this invention that information be read from a magnetic core matrix and stored back therein in an overlapping cycle of operation in which the information from one core is read from that core, information priorly read from a preceding core in the matrix is stored in that core, after being modified as required, information from a subsequent core is read from that subsequent core, and the information from the initial core is then stored in that core, after being modified as required. It is therefore a feature of this invention that information precess through the cores of a magnetic core matrix at a regular rate, the information pertinent to a particular address or unit in the overall system not being always located in a particular core or group of cores.

It is a further feature of this invention that information read from a core in a magnetic core matrix be temporarily stored, compared with incoming information, then temporarily stored again, after being modified as required by the incoming information, and placed back in a subsequent core in the matrix and not in the core from which the information had originally been read. More specifically, it is a feature of this invention that the information be placed back in a subsequent core, the information just read from any core being stored in a first bit storage register and the information to be stored back in that core being stored in a second bit register circuit.

It is a further feature of this invention that single writing wire thread all the cores of a magnetic core matrix. More specifically, it is a feature of this invention that information be stored in a core in the magnetic core matrix by always applying thereto coincident writing current pulses sufficient to switch the magnetic state of the core to write one binary value of information, a blocking or inhibiting pulse being applied to the writing wire of opposite polarity to the aforementioned writing pulses to prevent the switching of the state of the magnetic core if the other value of binary information is to be stored in the magnetic core.

It is another feature of this invention that a write amplifier be connected to the single writing wire, the operation of the writing amplifier being dependent on the value of information priorly stored in the second bit register circuit, appropriate gating signals being applied so that the operation of the write amplifier circuit is always coincident with the application of the writing pulses from the driving pulse sources.

Figure 2:
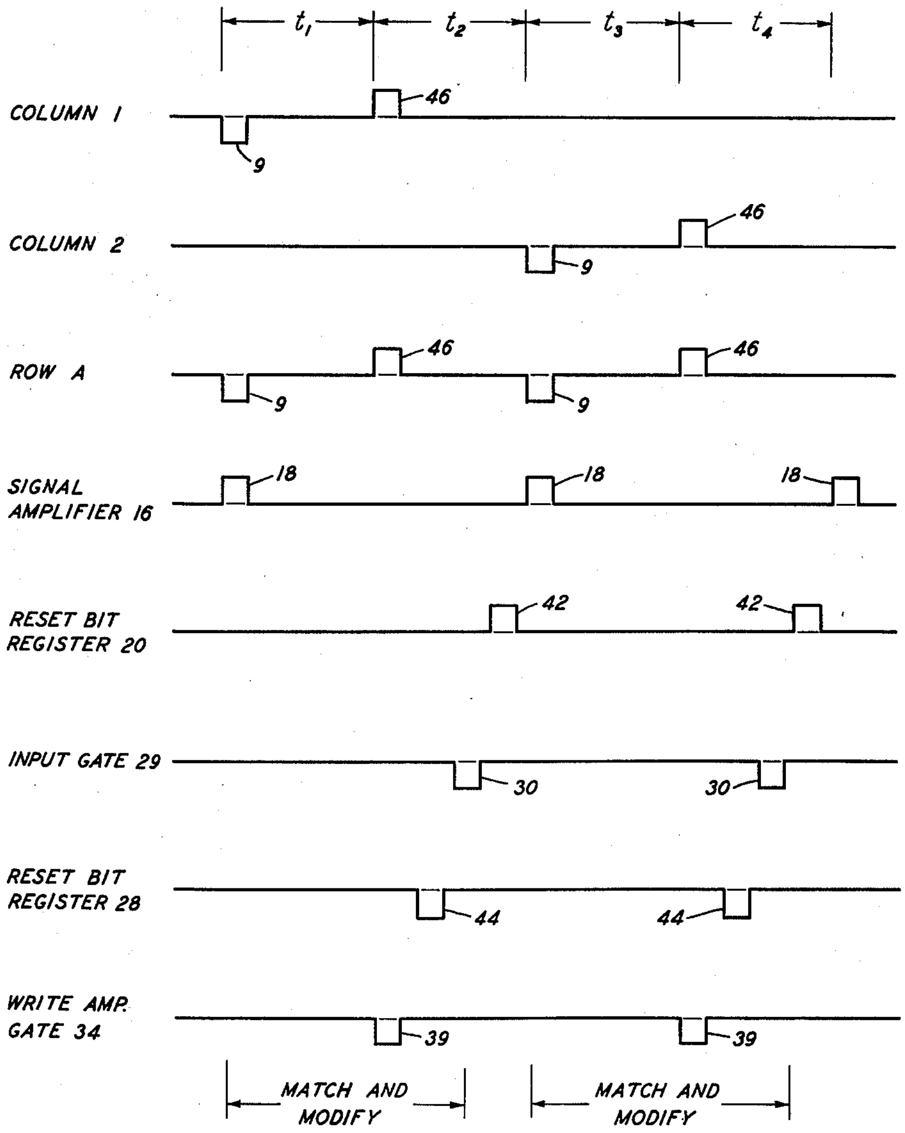
Figure 3:
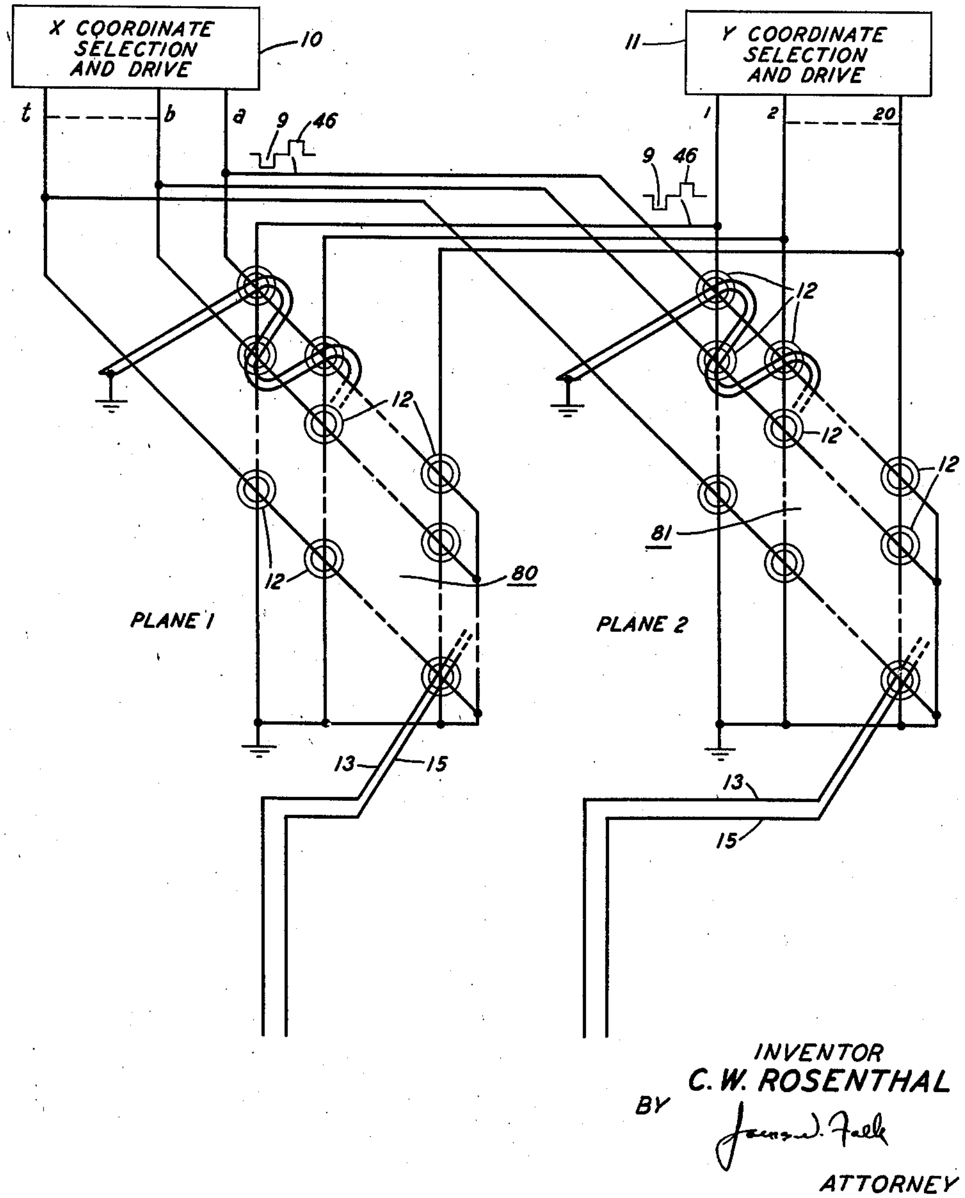
Figure 4:
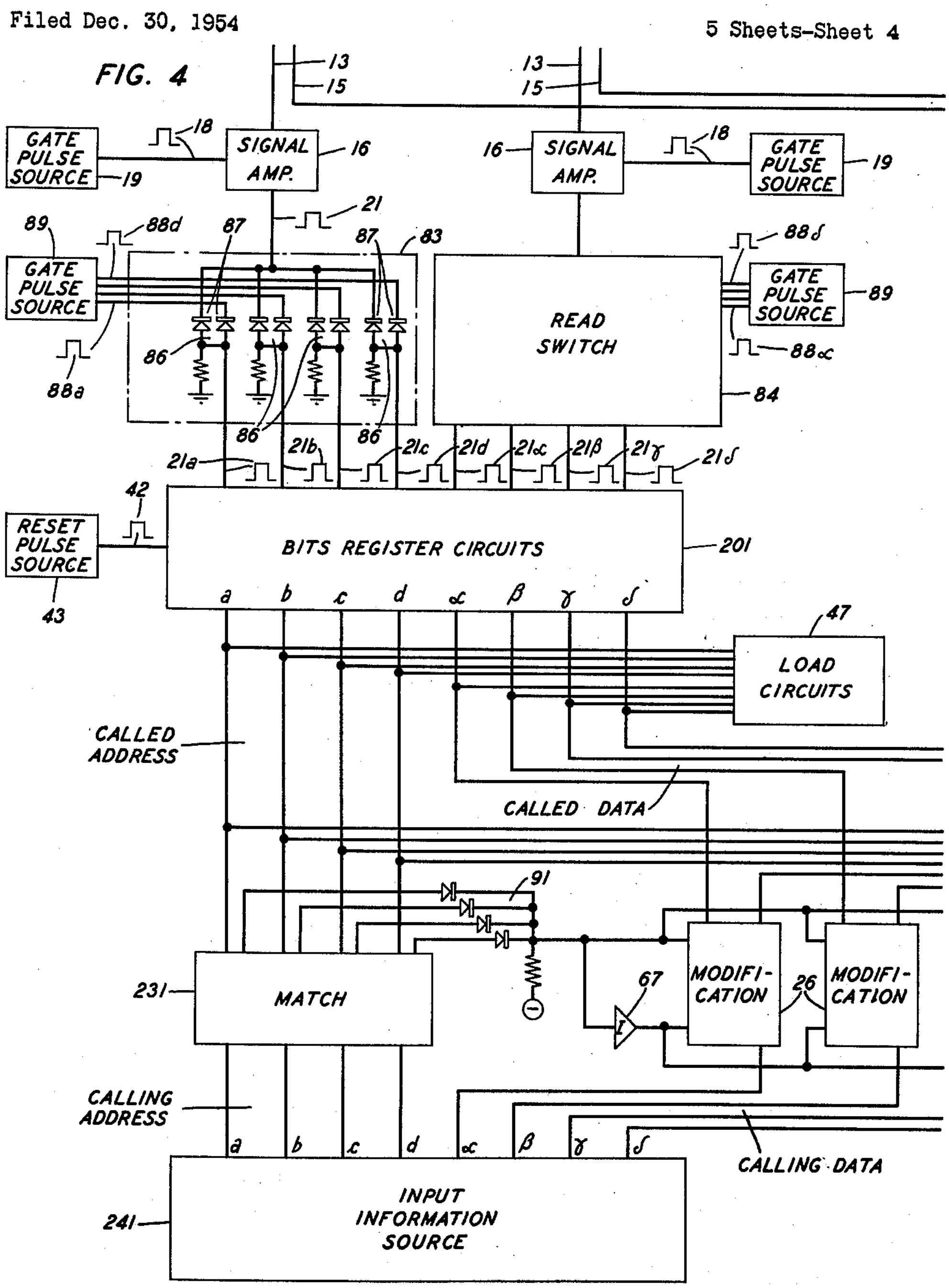
Figures 5, 6:
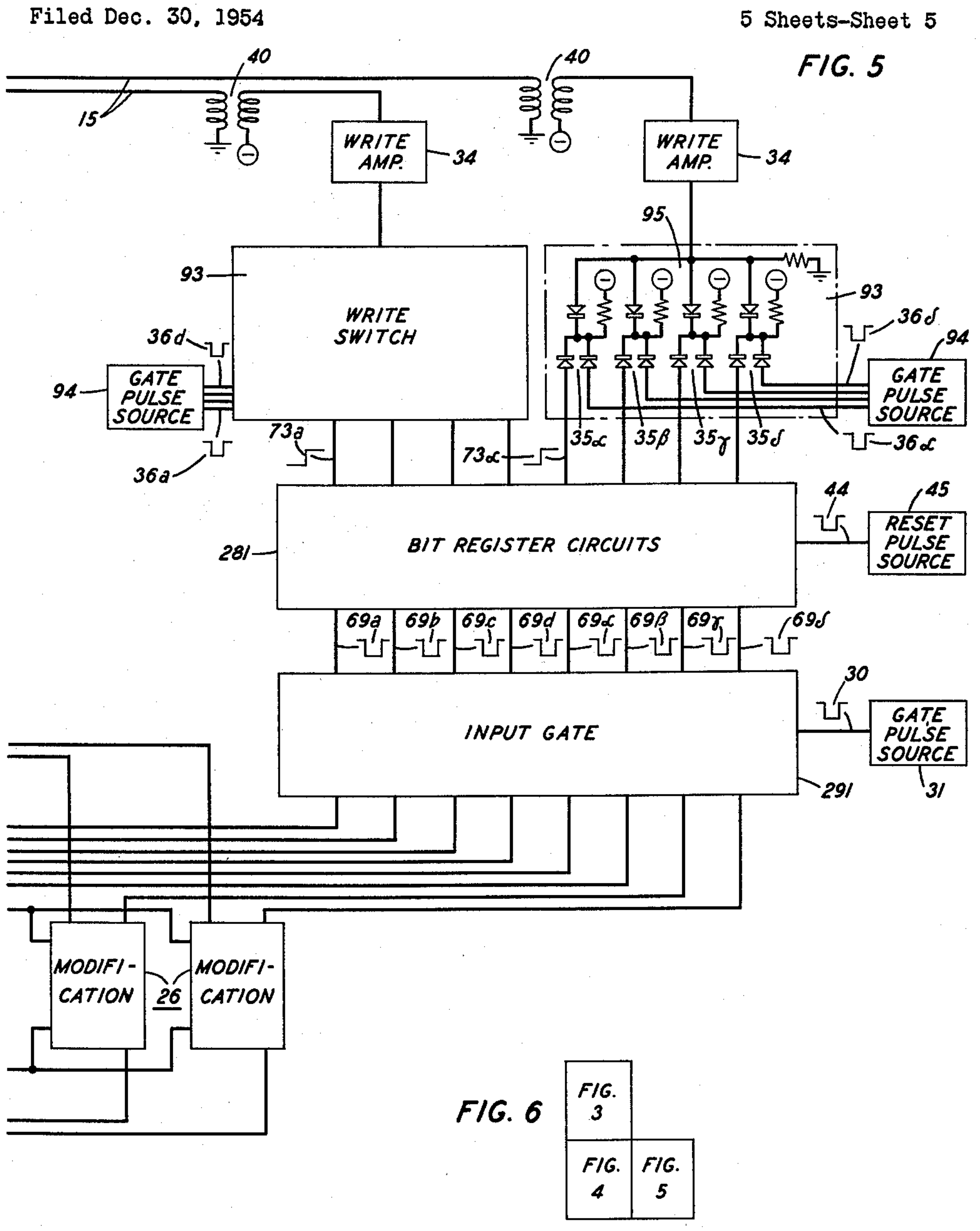

A complete understanding of this invention and of these and various other features of this invention may be gained from consideration of the following detailed description and the accompanying drawing, in which:

Fig. 1 is a schematic representation of a very simple embodiment of this invention for purposes of illustrating the principles of the invention;

Fig. 2 is a pulse time chart illustrating the timed relationship of various enabling and activating pulses in the embodiment of Fig. 1; and Figs 3, 4, and 5 are a representation, mainly in block diagram form, of another specific illustrative embodiment of this invention wherein address and data bits of information are stored in separate magnetic core matrices, the figures being arranged as indicated by Fig. 6.

Referring now to the drawing, one simplified specific embodiment of this invention is depicted in Fig. 1 and the principles and operation of this invention can best be described and understood with reference to this embodiment. In this specific embodiment, single bits of information are read from a storage array, compared with an incoming bit of information, and written back in the storage array in an overlapping cycle of operation, in accordance with aspects of this invention. Read driving pulses 9 are applied, simultaneously, from driving pulse sources 10 and 11 to the row and column leads, respectively, or selection wires of an N by Z matrix of magnetic cores 12, each core being intersected or threaded by one row lead and one column lead in the same sense. A single read-out wire 13 is threaded through each core 12 of the matrix and the stored content of any core to which driving pulses 9 have been applied will appear as an output pulse 14 on this lead. Also a single writing wire 15 is threaded through each of the cores 12 in the same sense as the select wires; the purpose of this writing wire 15 is discussed further below.

The information read out of the core is applied through a signal amplifier 16, which is gated by a gate pulse 18 from a gate pulse source 19, to a single bit register circuit 20. The output of the signal amplifier 16 is a pulse 21 if an output pulse 14 is present. The information is temporarily stored in the bit register 20 and compared, by a match circuit 23, with the incoming bit of information from an input information source 24. The result of this comparison together with the stored and input information is applied to a modification circuit 26 which performs the following logic: if the stored information is the same as the input information, the input information is to appear at the output of the modification circuit 26 but if the stored information is different from the input information, then the stored information is to appear at the output of the circuit 26. The reasons for this logical requirement will become apparent below and particularly from consideration of the embodiment of this invention depicted in Figs. 3, 4, and 5.

The output of circuit 26 is applied to a second bit register circuit 28 through an input gate 29 controlled by a gating pulse 30 from an input gate source 31. The information stored in the bit register 28 is then applied, at the appropriate time, to a write amplifier circuit 34 through a write amplifier gate 35, enabled by a gate pulse 36 from a gate pulse source 37. The write amplifier can then apply an inhibiting or blocking pulse 39 to the single writing wire 15 through a transformer 40 if the binary value of information to be written or stored back in the core is such that on the next reading of the core no output pulse 14 is to appear on the single read-out wire 13, as described further below.

Bit register circuit 20 is reset by a reset pulse 42 from a pulse source 43 when the information stored in that bit register circuit has been stored, as modified, in bit register circuit 28; and bit register circuit 28 is reset by a reset pulse 44 from a pulse source 45 when the information stored in that bit register circuit has been applied, through the writing amplifier circuit 34, to determine the storage of the binary value of information in the particular core in the matrix having coincident writing pulses 46 applied to it at that instant.

The information read from the matrix is of course utilized by external load circuits 47 which may advantageously be connected to the output of the bit register circuit 20 as the information read from the core in the matrix appears there as a voltage step 48 or change in voltage for a period of time until the register is reset rather than as a short pulse, such as the read out pulse 14.

The timing of the circuit is such that the pulse 39 is always applied at the same time as the writing driving pulses 46 from the driving pulse sources 10 and 11. The pulse 39 is of opposite polarity to the pulses 46 and advantageously equal in magnitude to one of the pulses. As the simultaneous occurrence of both pulses 46 is required to switch the magnetic state of a core and therefore to store that particular value of information in the core, the presence of a pulse 39 on the writing wire 15 threading all cores serves to inhibit the switching of the magnetic state of that core. Thus one binary value of information, which we shall define as a "1," is stored in a magnetic core 12 in the matrix if the core is switched by the simultaneous occurrence of pulses 46 while the other binary value of information, which we shall define as "0," is stored in a magnetic core 12 if the blocking or inhibiting pulse 39 is present to prevent the magnetic state of that core being switched.

While the progress of a single bit of information from a core in the matrix, through the external logic circuitry, and back to a core in the matrix has been briefly outlined above, one important aspect of this invention has not been referred to, namely, that the information is not placed back in the matrix in the same core from which it has been read but in an adjacent core. This can be readily seen if we consider the operation of the specific embodiment of Fig. 1 together with the timing chart of Fig. 2 which indicates the timing relationship of the various reset, gating, and driving pulses utilized to attain proper synchronization of the operation of the components of the circuit. The pulses shown in Fig. 2 are therefore enabling pulses for the components indicated.

Let us assume that the value "1" has been stored in the A–1 core 12, which is the core common to row A and column 1, and that on simultaneous application of the reading pulses 9 to the selection wires threading this core from sources 10 and 11, an output pulse 14 appears on the read-out wire 13 due to switching of the magnetic state of the core. The reading pulses 9 are applied at the start of the time $t_1$, as seen in Fig. 2, at which time a gating pulse 18 is also applied from source 19 to the signal amplifier 16 enabling that amplifier to apply a pulse 21 to the bit register circuit 20, setting that circuit and storing the core's output information therein. As soon as that circuit is set, the match and modification circuits 23 and 26 can compare the priorly stored information with the input information and determine whether the priorly stored information or the input information is to be written back into the matrix. The time for this match and modification operation is indicated at the bottom of Fig. 2.

At the start of time $t_2$, the driving pulse sources 10 and 11 apply writing pulses 46 to the row A and column 1 leads. However, as indicated in Fig. 2 the matching and examining operations have not yet been completed and therefore the information priorly in core A–1, as corrected by the present input information, cannot be placed back in that core. Instead, at the start of time $t_2$ the writing amplifier gate 35 is enabled by pulse 36, permitting the operation of the writing amplifier 34 to be determined by the information stored in the bit register circuit 28. This information bit relates to information priorly read from the preceding core in the matrix. Accordingly the reading and writing cycles of two bits of information are interleaved.

As soon as the information stored in the bit register circuit 28 has been applied to the writing amplifier 34 and placed back in the matrix, in core A–1 in this instance, the bit register circuit 28 can be reset by a reset pulse 44 and is available for the temporary storage of the result of the operation of the match and modification circuits with regard to the bit of information priorly read from the core A–1. The input gate 29 is thus enabled, by pulse 30, to allow the bit register circuit 28 to be set with this next bit of information. Again as soon as the information has been passed through to the second bit register 28, it is no longer needed in the first bit register circuit 20 and a reset pulse 42 is applied from the reset pulse source 43 to the bit register 20.

The bit register circuit 20 is now available for information from the next core in the matrix, which we shall assume to be core A–2, i.e., we shall assume that the driving pulse sources 10 and 11 are programmed to apply successive read and write pulses 9 and 46 to energize each core in a row in succession and then successive rows. Accordingly, at the start of time $t_3$ when the reading pulses 9 are applied to core A–2 a gate pulse 18 is applied to the signal amplifier 16 and the information bit priorly stored in core A–2 read out on wire 13 and temporarily stored in bit register 20. Then at the start of time $t_4$ the write amplifier gate 35 is enabled and the information bit stored in the bit register 28 is applied to the write amplifier 34 to determine the information to be written into core A–2.

It can therefore be seen that the reading and writing cycle for an information bit from a particular core is interleaved with both the writing part of the cycle for the information bit from the next prior core, which is now to be written, as modified, into the particular core, and the reading part of the cycle for the information bit from the next succeeding core, into which succeeding core the information, as modified, from this particular core is to be written. In a sense this can be considered to a two-stage operation in that for each occurrence of a pulse from the driving source 9 and 10, an information bit is being read or written in the matrix, even though the time required for examining and modifying the information bit because of the incoming information bit requires more time than that.

In a specific illustrative embodiment depicted in Fig. 1, signal amplifier 16 comprises a transistor 51 having a negative clamping voltage applied from a source 52 through a resistance 53 to the collector of the transistor and a diode 54 through which the enabling pulse 18 is applied from a pulse source 19. When an output pulse 14 appears on the read wire 13, the transistor is operated; but due to the clamping voltage 52, the collector current does not appreciably change. However, on the simultaneous application of an output pulse 14 and the enabling pulse 18 through the diode 54 the effect of the clamping voltage 52 is removed and a pulse 21 is applied to the normally non-conducting transistor 56 of the bit register circuit 20. The enabling pulse 18 is advantageously a positive going pulse which may go from a negative value of D.-C. voltage to substantially ground potential and the pulse 21 is similarly a positive going pulse which may advantageously go from a negative value to slightly less than ground potential.

When the pulse 21 is normally applied to the base of transistor 56, that transistor is turned on and the voltage at its collector decreases to some negative value. This decrease in voltage which is indicated in Fig. 1 by the voltage step 48 corresponds to the value of stored data $e_0$ which we shall define to be equal to the storage of a binary "1." If the pulse 21 is not applied to the bit register circuit 20, then the output at the collector of the transistor 56 remains high and the collector of the normally conducting transistor 57 remains low, as shown by voltage 58. This low value of voltage at the collector of transistor 57 indicates that a binary "0" had been stored in this core and this we shall define to be the value $e'_0$. Both $e_0$ and $e'_0$ are applied to the match circuit 23 which comprises a pair of negative AND circuits 60 whose outputs are connected together in a negative OR circuit 61. To one of the negative AND circuits 60 are applied the binary value $e_0$ and the input information $e_i$. To the other of the negative AND circuits 60 is applied the binary value $e'_0$ and the negation of the input information $e'_i$. The logic of the match circuit can be specified by the following symbolic logic equation, in terms of Boolean algebra, in which $e_m$ designates a match signal which occurs when a match has taken place at one of the negative AND circuits 60:

$$e_m = e_i e_o + e'_i e'_o \qquad (1)$$

The matched signal $e_m$ together with the stored signal $e_o$ and the input signal $e_i$ are applied to the modification circuit 26. This circuit comprises a pair of negative AND circuits 64 whose outputs are connected through a negative OR circuit 65. In this specific exemplary embodiment for purposes of explanation of the principles of this invention, we shall assume the logic that the stored value is to be written back in the matrix if a match has not occurred and the input information is to be written in the matrix if a match has occurred. Therefore, we can write the logical operation in the modification circuit 26 as follows, assuming the output signal of this circuit to be $e_s$:

$$e_s = e_m e_i + e'_m e_o \qquad (2)$$

In the specific embodiment of the modification circuit 26 the match signal $e_m$ is applied to one of the negative AND circuits 64 together with the input signal $e_i$ and is applied through an inverter 67 together with the stored signal $e_o$ to the other of the AND circuit 64. The inverter 67 may advantageously comprise a single transistor as depicted.

At this point it may be noted that for a single bit of information the match and modification circuits are actually superfluous, as due to the definition of $e_m$ given by Equation 1, we can simplify Equation 2 to:

$$e_s = e_o \qquad (3)$$

which states that the value of stored information is to be placed back in the matrix each time. This is obviously a trivial case as, for the logic that we have assumed, the stored information is never changed. However, as discussed further below, it will be apparent that the reading, examining and writing of a single bit of information in this embodiment is a greatly simplified case which clearly points out the principles of this invention applicable to other embodiments wherein a large number of bits of information are stored and read out for different purposes. Specifically, in other embodiments the matching process occurs for one set of stored and input values and the modification process on another set of stored and input values.

If a binary "1" is to be written back into the matrix, the signal $e_s$ is a negative going voltage step 68 which may advantageously decrease from substantially ground to a negative D.-C. value. This negative voltage is applied to the input gate 29 which is a negative AND gate, the other input of which is a similar negative going pulse 30 from the gate pulse source 31. On the simultaneous occurrence of the negative pulses 68 and 30, a negative going pulse 69 is applied from the input gate 29 to the bit register circuit 28 and specifically to the base of the normally conducting transistor 71 of this circuit. This negative pulse 69 turns off the normally conducting transistor 69 while turning on the normally nonconducting transistor 72 of the bit register circuit 28.

The output of the bit register circuit 28 is taken from the collector of the normally conducting transistor 71 and is therefore a positive going voltage step 73 when a binary "1" is to be written back into the matrix. The voltage step 73 is applied to the write amplifier gate 35 which is a negative AND gate, the other input of which is the negative going pulse 36 from gate pulse source 37. As gate 35 is a negative AND circuit, no output appears when the voltage step 73 occurs, that is when a binary "1" is to be written back into the matrix. Accordingly, under these conditions the output of the gate 35 remains high and the write amplifier 34 is not triggered.

However, were a binary "0" to be written back into the matrix, then the output of the modification circuit 26, $e_s$, would remain high and input gate 29 would not be enabled. The output of gate 29 would remain high and transistor 71 would not be turned off. Then the output of the bit register 28 would be a low value of voltage which together with the negative going pulse 36 would enable the write amplifier gate 35 and apply a negative going pulse to the base of the amplifier transistor 75 of the write amplifier circuit 34 thereby turning that circuit on, producing a negative pulse which is applied, for impedance matching purposes, to the base of an inverting transistor 76 causing a positive pulse to appear on the collector of transistor 76. This positive pulse is applied to an inverting transformer 40 so that the negative blocking or inhibiting signal 39 appears on the write wire 15 which is connected to the output of the secondary of the inverting transformer 40.

As noted above, if a binary "1" is to be inserted, the write amplifier 34 is not enabled and therefore a blocking pulse 39 does not occur. Accordingly, on the simultaneous occurrence of the writing pulse 46, the magnetic state of the particular core to which these pulses are applied is switched and binary "1" is stored. However, as noted above, if the blocking pulse 39 appears, the resulting magnetomotive force applied to the core is insufficient to switch the magnetic state of that core and a binary "0" is stored in that core.

The driving pulse sources 10 and 11 may themselves comprise magnetic core circuits, such as magnetic core shift register circuits or, more specifically, magnetic core circuits of the type disclosed in Patent No. 2,719,961, issued October 4, 1955, of Mr. Karnaugh.

As mentioned above, the storage and utilization of a single bit of information is the basic case. However, in the usual employment of the principles of this invention the information stored will comprise a number of single bits, which together comprise an information message. Further, because this information message is not always stored in the same set of cores in the matrix, but precesses through the matrix due to the overlapping cycle of operation described above, address bits of information should be utilized together with the stored data or message to identify that data. In the embodiment of this invention depicted in Figs. 3, 4, and 5, which are to be read together as indicated in Fig. 6, two planes of cores are utilized, the one plane comprising a twenty by twenty matrix 80 of cores 12 and the other plane a twenty by twenty matrix 81 of cores 12; circuit elements common to this embodiment and that of Fig. 1 will be designated by the same reference character while elements basically the same, as by comprising a number of the individual circuits of Fig. 1, will be designated by the same reference character and an additional digit.

In this embodiment, it is assumed that the data message is stored in matrix 81 and comprises four bits of information which we shall designated $\alpha$, $\beta$, $\gamma$, and $\delta$ and that the address is stored in matrix 80 and similarly comprises four bits of information which we shall designate *a*, *b*, *c*, and *d*. A single read wire 13 threads each core 12 in each of the matrices and a single writing wire 15 similarly threads each core 12 in each of the matrices.

The operation of this embodiment is basically the same as that of the prior embodiment. When it is desired to modify a message stored in the matrix 81, the calling address and calling data are applied from the information source 241 for one complete scanning cycle, i.e., during the time requisite to scan every core in each matrix. It is to be understood that two matrices 80 and 81 are pulsed simultaneously from common driving pulse sources 10 and 11. Output signals appearing on the wires 13 are applied from the signal amplifier circuits 16 through reading switches 83 and 84 to a bit register circuit 201, which may advantageously comprise eight individual bit register circuits 20 of the type described above with reference to the embodiment of Fig. 1. Each read switch 83 and 84 comprises four positive AND gates 86, each comprising a pair of diodes 87, the inputs of which are the positive signal 21 from the signal amplifier and a positive going pulse 88 from a gate pulse source 89. The enabling pulses 88*a*, 88*b*, etc. and 88$\alpha$, 88$\beta$, etc. are applied in succession from the gate pulse source to each of the gates 86 of the read switches. Accordingly in this specific embodiment, four reading pulses must be applied to the matrices 80 and 81 before a complete address and complete data message are available in the bit register circuits 201 for the match and modification operations of the circuit.

In the normal operation of this embodiment a match will only occur on one of the possible addresses stored in the matrix 80. For all other addresses, no match will occur and the stored data that has been read from the matrix 81 is to be written or stored back in the matrix without the possibility of modification. However, when a match does occur between the called and calling addresses, then the calling data from the input information source 241 is to be written back into the matrix. Accordingly the logic of the modification circuits 26 is to be that the output signal $e_s$ is given by the expression:

$$e_s = e_m e_i + e'_m e_o \quad (4)$$

which is the same as Expression 2 for the embodiment of Fig. 1. Accordingly the modification circuits 26 may be identical with those described above.

In this embodiment, however, it is necessary that the match occur not on a single bit of information but between all four bits of information of the calling and called addresses. Accordingly, the outputs of each individual circuit of the match circuit 231, seen in Fig. 4, are combined in a negative AND circuit 91 so that a match signal $e_m$ only appears when a match has occurred between all four bits of the address. No modification operation is performed on the address information; regardless of the outcome of the match circuit 231, the address remains the same. Accordingly, the called address is applied directly from the bit register circuits 201 to the input gate 291 to be stored, temporarily, in the bit register circuits 281. The called and calling data, however, are applied to the modification circuits 26, and the outputs of these circuits connected to the input gate 291.

At the appropriate time the input gate 291 is enabled, by a pulse 30 from the gate pulse source 31, and the called address and called or calling data are stored in the bit register circuits 281. The outputs of the bit register circuits 281 are connected to individual write amplifier gates 35*a*, 35*b*, etc., and 35$\alpha$, 35$\beta$, etc., in write switches 93. Each write switch 93 comprises four negative AND gates 35, the inputs of which are from a bit register circuit and a gate pulse source 94, and a negative OR circuit 95 to which the output of each of the AND circuits 351 is connected. The output of the OR circuit is connected to the write amplifier 34. Enabling pulses 36*a*, 36*b*, etc., and 36$\alpha$, 36$\beta$, etc., are applied to each of the AND gates 35 in succession.

The operations of the circuits of this specific embodiment are the same as that described above for the embodiment of Fig. 1 and the timing and overlapping cycle of operation is essentially the same. However, in this embodiment in each matrix 80 and 81 the information that is stored back into a core is not the information that had been read from the prior core in the matrix but from the fourth prior core, i.e., from the core which had stored in it the same item *a*, *b*, etc., or $\alpha$, $\beta$, etc., in the priorly stored information message. This is because it is necessary to wait until all four bits of information have been read and placed in the bit register circuits 171 before the match and modification process can start. The overlapping cycles are thus of four information bits rather than a single information bit.

Thus, while gating pulses 88 and 36 are applied for each occurrence of the reading or writing drive pulses 9 and 46, respectively, the reset pulses 44 and 42 and the input gate pulse 30 are only applied once for each four cycles of drive pulses 9 and 46; specifically, the reset pulses and gate pulse 30 are applied after the write switch gating pulses 36*d* and 36$\delta$ are applied to the write switches 93 and before the gating pulses 88*a* and 88$\alpha$ are applied to the reading switches 83 and 84, respectively. The pulses are applied in the order 44, 30, 42 as in the one bit illustration.

It is to be understood that considerably more bits of information than four could be utilized for either the stored data or the stored address and that a number of information data matrices, such as matrix 81, can be utilized with a single address matrix, such as matrix 80; or a number of address data matrices, such as 80, can be utilized with a single information data matrix such as 81. Thus the overlapping cycle of operation may be such that the information bit stored in a particular core may have been read from the adjacent core or any remote core in the matrix, depending on the programming of the matrix and the number of information bits in the data message being scanned.

It is therefore to be understood that the above described arrangements are illustrative of the application of the principles of the invention. Numerous other arrangements may be devised by those skilled in the art without departing from the spirit and scope of the invention.

What is claimed is:

1. A memory circuit comprising a matrix of magnetic cores, means for reading information stored in one of said cores, said reading means including a single output wire threading all of said cores, means connected to said output wire for temporarily storing said information, and means for storing said information back in said matrix in a different core from which it had priorly been read.

2. A memory circuit in accordance with claim 1 wherein said means for storing said information back in said matrix includes a writing wire threading each of said cores.

3. A memory circuit comprising a matrix of magnetic cores, a plurality of selection wires threading each of said cores, a single read-out wire threading said cores, means for applying pulses of one polarity to said selection wires to read information out of said cores, means connected to said output wire for temporarily storing said information, and means for writing said information back in said matrix, said last-mentioned means including means for applying pulses of the opposite polarity to said selection wires to switch the magnetic state of a core, a single write wire threading said cores, and means for applying an inhibiting pulse to said write wire when the magnetic state of said core is not to be switched by said pulses of opposite polarity.

4. A memory circuit in accordance with claim 4 wherein said information in said temporary storage means is written back in said matrix by said writing means in a different core than that from which it had been read.

5. A memory circuit comprising a matrix of magnetic cores, a plurality of selection wires threading each of said cores, a single output wire threading said cores, means for applying pulses of one polarity to said selection wires to read information out of one of said cores, storage means connected to said output wire temporarily to store said information read from said one core, a source of input information, means for comparing said information in said temporary storage means with said input information, and means controlled by the output of said comparison means for writing said information from said storage means or said input information back in said matrix, said last-mentioned means including means for applying pulses of the opposite polarity to said selection wires to switch the magnetic state of a core in said matrix, a single write wire threading said cores, and means for applying an inhibiting pulse to said write wire to prevent the switching of the magnetic state of said core in said matrix by said pulses of opposite polarity.

6. A memory circuit comprising a matrix of magnetic cores, a plurality of selection wires threading each of said cores, a single output wire threading said cores, means for applying pulses of one polarity to said selection wires to read information out of one of said cores, said information being of two possible values, storage means connected to said output wire temporarily to store said information read from said core, a source of two-valued input information, means for comparing said information in said temporary storage means with said input information, and means controlled by said comparison for writing information in a core in said matrix, said last-mentioned means including means for appying pulses of the opposite polarity to said selection wires to write one value of information in said core in said matrix and means including a single wire threading said cores for inhibiting the writing of said one value of information.

7. A memory circuit in accordance with claim 7 wherein said means for writing said information in a core in said matrix further comprises a second storage means for temporarily storing said information and gating means connected to said second temporary storage means, whereby said information is written back in said matrix in a core other than said one core.

8. A memory circuit comprising a matrix of magnetic cores, a plurality of selection wires threading each of said cores, a single output wire threading said cores, means for applying pulses of one polarity to said selection wires to read information out of successive ones of said cores, said information being of two possible values, first temporary storage means connected to said output wire, a source of two-valued input information, means for comparing said information in said first temporary storage means with said input information, and means controlled by said comparison for placing the information from said firs temporary storage means or said input information in a different core in said matrix than that from which said information in said first temporary storage means had been read, said last-mentioned means including second temporary storage means, a writing wire threading said cores, means for applying pulses of the opposite polarity to said selection wires to switch the magnetic state of said cores successively, and means controlled by the information in said second temporary storage means for applying an inhibiting pulse to said writing wire to prevent the switching of the magnetic state of a core.

9. A memory circuit in accordance with claim 8 wherein said pulses of one and opposite polarities are alternately applied to said selection wires and further comprising means for resetting said second temporary storage means after said pulses of opposite polarity have been applied to said selection wires, gating means for storing said information from said first storage means or said input information in said secondary storage means after said second storage means has been reset, and means for resetting said first temporary storage means after operation of said gating means.

10. A memory circuit in accordance with claim 9 wherein the information read from a particular core on application of said pulse of one polarity is stored in said first storage means while the information priorly stored in said second storage means is placed back in said particular core by said pulses of opposite polarity and said inhibiting pulse.

11. A memory circuit comprising a pair of magnetic core matrices, data information being stored in one of said matrices and address information being stored in the other of said matrices, selection wires threading the cores of said matrices, a single output wire threading the cores of each matrix, means for applying pulses of one polarity to said selection wires to read information successively out of the cores of said matrices, first temporary storage means connected to said output wires, a source of input information, said input information comprising a calling address and calling data, means for matching said calling address and said address information in said first temporary storage means, and means for writing the data information from said first storage means or the calling data back in said data information matrix depending on the output of said matching means, said last-mentioned means including second temporary storage means and means for applying pulses of opposite polarity to said selection wires, said information in said second temporary storage means being written back in different cores than the cores from which the information had been priorly read out to said first temporary storage means.

12. A memory circuit in accordance with claim 11 wherein said writing means further comprises a single writing wire threading each core in said data matrix and means for applying an inhibiting pulse to said writing wire coincident with said pulses of opposite polarity dependent on the value of information in said second storage means.

13. A memory circuit in accordance with claim 12 further comprising means for storing said address information back in said address matrix, said storing means including said second temporary storage means, a single writing wire threading the cores in said address matrix, means for applying pulses of opposite polarity to said selection wires, and means for applying an inhibiting pulse to said writing wire coincident with the application of said pulses of opposite polarity dependent on the address information stored in said second storage means.

14. A memory circuit in accordance with claim 13 wherein said data and address information are stored back in different sets of magnetic cores than those from which said information had been read.

15. A memory circuit comprising an array of two-valued memory elements, means for reading an information bit from a particular element in said array, means for temporarily storing said information bit, means for modifying said information bit in accordance with input information, and means for writing said information bit as modified in a subsequent element in said array.

16. A memory circuit comprising a matrix of magnetic cores, means for applying pairs of pulses of opposite polarity successively to different cores in said matrix, said pulses of one polarity switching the magnetic state of said cores to read out an information bit stored in said cores and said pulses of opposite polarity switching the magnetic state of said cores to write an information bit in said cores, a pair of temporary storage means, means for applying the information bit read from a particular core to the first of said storage means on application of pulses of said one polarity to said particular core, and means for applying a different information bit stored in the second of said temporary storage means to said particular core coincident with the application of said opposite polarity pulses thereto to determine the writing of said different information bit in said particular core, said different information bit having priorly been read from a different magnetic core, whereby on each application of said pulses of one and opposite polarity to said cores information bits are read from and written in said cores.

17. A memory circuit in accordance with claim 16 wherein said means for applying a different information bit to said particular core includes a single writing wire threading said cores in said matrix and means for applying an inhibiting pulse to said writing wire, said inhibiting pulse being of the same polarity as said one pulses.

References Cited in the file of this patent

UNITED STATES PATENTS

| | | |
|---|---|---|
| 2,681,181 | Spencer | June 15, 1954 |
| 2,700,148 | McGuign et al. | Jan. 18, 1955 |
| 2,719,965 | Person | Oct. 4, 1955 |

UNITED STATES PATENT OFFICE

CERTIFICATE OF CORRECTION

Patent No. 2,922,988 January 26, 1960

Charles W. Rosenthal

It is hereby certified that error appears in the printed specification of the above numbered patent requiring correction and that the said Letters Patent should read as corrected below.

Column 11, line 19, for the claim reference numeral "4" read -- 3 --; line 59, for the claim reference numeral "7" read -- 6 --.

Signed and sealed this 26th day of July 1960.

(SEAL)

Attest:

KARL H. AXLINE
Attesting Officer

ROBERT C. WATSON
Commissioner of Patents